US 6,644,571 B2

(12) United States Patent
Anton et al.

(10) Patent No.: US 6,644,571 B2
(45) Date of Patent: Nov. 11, 2003

(54) CONTAINMENT APPARATUS FOR COLLECTING FRAGMENTS OF FOAM INSULATION

(75) Inventors: Claire E. Anton, Los Alamitos, CA (US); Robert Coker, III, Whitier, CA (US); Rodney Fancher, Anaheim, CA (US); James D. Gamboa, Anaheim, CA (US); Paul Keister, Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 87 days.

(21) Appl. No.: 10/024,163

(22) Filed: Dec. 18, 2001

(65) Prior Publication Data

US 2003/0111565 A1 Jun. 19, 2003

(51) Int. Cl.$^7$ ............................................... B02C 19/12
(52) U.S. Cl. ............................ 241/18; 134/8; 134/21; 134/123; 134/165 R; 241/27; 241/60; 241/301
(58) Field of Search ..................... 134/8, 21, 166 R, 134/123; 241/30, 23, 1, 60, 27, 301, 5, 39, 18

(56) References Cited

U.S. PATENT DOCUMENTS

| 5,534,077 A | * | 7/1996 | Lichtblau et al. | ............... 134/7 |
| 5,899,217 A | * | 5/1999 | Testman, Jr. | ............. 134/104.4 |
| 5,932,026 A | * | 8/1999 | Trampusch | ..................... 134/7 |

* cited by examiner

Primary Examiner—Mark Rosenbaum
(74) Attorney, Agent, or Firm—Alston & Bird LLP

(57) ABSTRACT

An apparatus comprises a containment chamber, a foam inlet, a vacuum port, and an air inlet. The containment chamber is a walled structure having a foam inlet. The surrounding of the foam inlet is shaped to correspond to the internal dimensions or surface structure of an aircraft fuselage or other aerospace structure. Because the surrounding of the foam inlet corresponds to the shape of the insulated structure, the containment apparatus may be mated with the portion of the structure having the insulation removed or captured. The vacuum port of the apparatus is connectable to a vacuum source, and the apparatus is utilized to suction particulate foam material from the insulated structure.

33 Claims, 3 Drawing Sheets

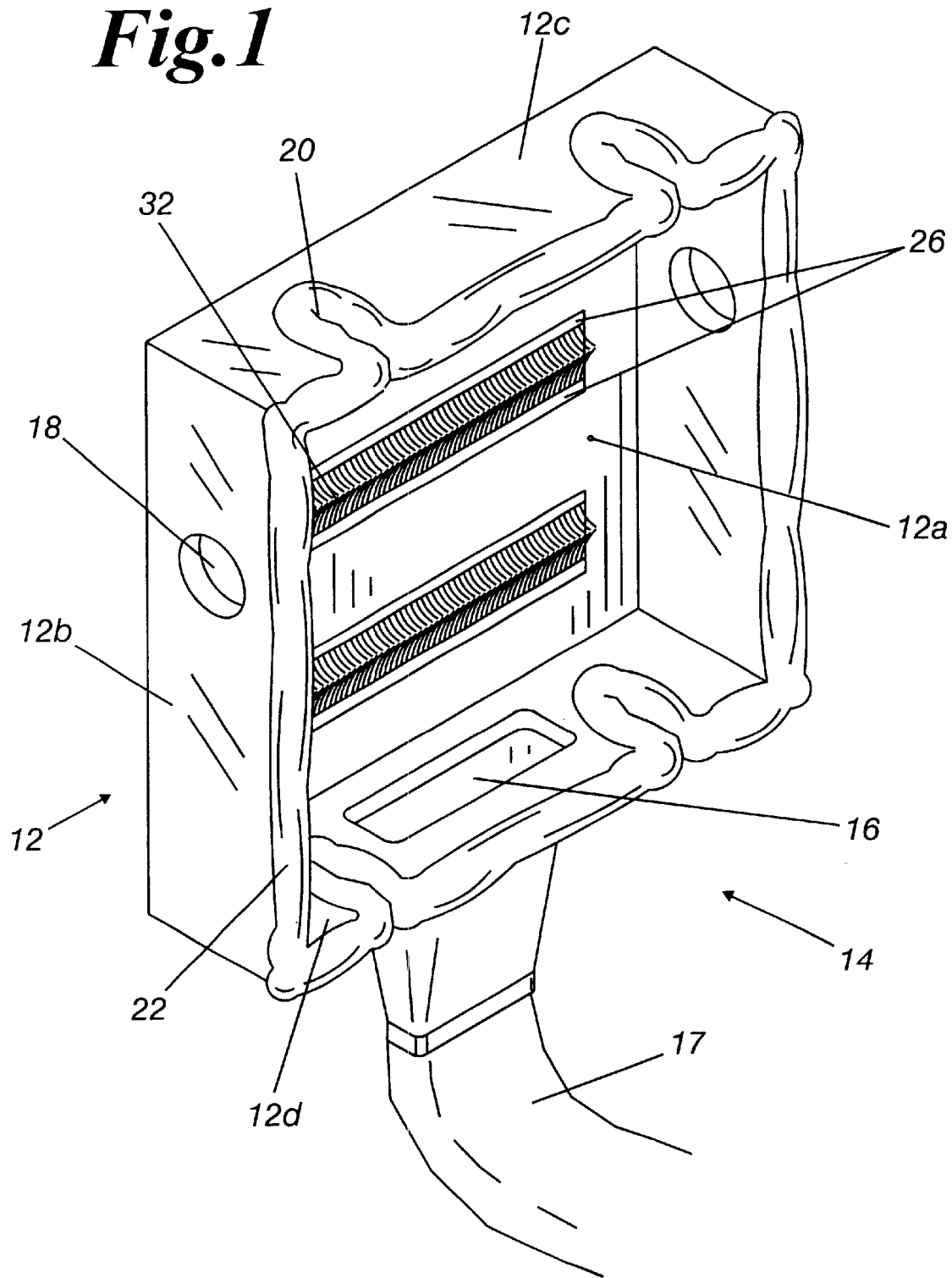

CONTAINMENT APPARATUS FOR COLLECTING FRAGMENTS OF FOAM INSULATION

FIELD OF THE INVENTION

The present invention relates to the removal of spray-on foam insulation from aerospace structures or systems, and an apparatus capable of removing and collecting fragmented particles of foam insulation, and more particularly relates to an apparatus for removing and collecting fragments of spray-on foam insulation from the interior of an aircraft fuselage.

BACKGROUND OF THE INVENTION

Insulation is typically provided on the exterior and/or interior of aerospace systems, particularly between the outer bodies and the internal passenger compartments of aircraft fuselages. The insulation provides a number of functions including regulation of temperature, reduction of engine noise, reduction of noise from outside air turbulence, and protection of mechanical and structural components within the aerospace systems from moisture and temperature extremes which might tend to damage or corrode the components.

Until recently, fiberglass batting had been the preferred insulation for use within aircraft and other aerospace structures. Fiberglass has good thermal and structural properties, is fairly inexpensive, and has a long history of successful use in the aerospace industry.

Recently, however, the use of spray-on foam insulation has emerged as an alternative approach for insulating aerospace structures. Spray-on foam insulation, such as polyurethane or polyisocyanurate closed cell foam materials, are polymeric substances containing large volumes of air or other blowing agents dispersed within the polymer. The ability to blow the polymeric foams at the site of installations allows for the quick and easy installation of insulation within an aircraft fuselage or other structure, and the ability of the spray-on foam to flow and solidify around structural members and mechanical components allows more effective insulation of the members and components than previously possible with fiberglass insulation.

One disadvantage to the use of spray-on foam insulation is that, once solidified, the foam is difficult to remove. During the normal operation of an aircraft or spacecraft, routine inspections are made and routine maintenance is performed. Servicing of the aircraft often includes examination of components which have been insulated, which frequently requires removal of the insulation for visual inspection of the underlying structures. The insulation may be physically scraped away from the structure or component which it insulates, but such scraping is time consuming and is likely to cause damage to the underlying components and structures of the aircraft. Thus, physically scraping the insulation is an inefficient method of insulation removal.

It has been found that spray-on foam insulation may be effectively and efficiently removed using carbon dioxide pellet cryogenic blasting, known as dry ice stripping. Dry ice stripping works by projecting small pellets of dry ice, under pressure, toward the foam insulation to be removed. The dry ice impacts the foam at high speed and pulverizes the foam into small particles. The pressure with which the pellets are projected and the angle of impingement of the pellets upon the foam surface are adjusted so that the impacting pellets do not damage the underlying structures. In addition, most of the impact energy of the pellets is absorbed by the foam, leaving the underlying structures unharmed.

A major advantage of using dry ice for foam removal is that the dry ice sublimes after impact, leaving no solid or liquid residue. However, dry ice stripping does result in the fragmentation of the foam insulation, which has the potential to cause foreign object damage (FOD) within the aircraft. Even though removal of the spray-on insulation from the underlying substrate is facilitated by dry ice stripping, removal of the pulverized foam fragments from the area surrounding the removed foam is a painstaking procedure. It has heretofore been impractical to efficiently collect fragmented foam after a dry ice stripping or similar foam removal procedure.

What is needed is an apparatus which provides for the containment and collection of foam fragments after foam insulation has been removed from a substrate using dry ice stripping. The apparatus should provide for the removal of foam fragments and debris from the fuselage of an aircraft or other aerospace system with a minimum of manual labor and a minimum of time expenditure.

SUMMARY OF THE INVENTION

The present invention solves the problem associated with collection of foam insulation debris resulting from the rapid removal of spray-on foam insulation from aerospace systems by dry ice stripping or similar processes through use of an apparatus having a containment chamber which is shaped to correspond to the surface structure of the internal portion of an aircraft fuselage. The invented apparatus operates under a pressure differential such that foam fragments generated during a foam removal operation are suctioned and collected by the invented collection/storage apparatus.

The invented containment apparatus primarily comprises a containment chamber which defines a foam inlet, a vacuum draw port, and an air inlet. The containment chamber is a walled structure having one surface that is substantially or completely open, thus defining the foam inlet. The periphery of the foam inlet is shaped to correspond to the internal dimensions or surface structure of an aircraft fuselage. The phrase "aircraft fuselage" is used throughout as an example of the surface to which the invented apparatus is to be applied. However, it should be recognized that the invented containment apparatus is applicable to any of a variety of surfaces found in aerospace vehicles which are coated with spray-on insulation.

Because the surrounding of the foam inlet corresponds to the shape of the fuselage or other insulated structure, a containment area is formed by mating the containment apparatus with the portion of the fuselage having insulation to be removed or captured such that the apparatus forms a type of seal with the structure and such that insulation being removed from the structure can not migrate out of the containment area. For example, for small insulation removal projects, a smaller vacuum chamber may be used, with the surrounding of the foam inlet corresponding to and fitting around supporting members of the fuselage frame. For larger insulation removal projects, a large vacuum chamber may be used, with the surrounding of the foam inlet corresponding to and fitting within the general cylindrical diameter of the tubular fuselage. By utilizing a vacuum chamber which corresponds to the structure of the fuselage, there are few or no gaps between the vacuum chamber and the fuselage structure during operation of the apparatus once the apparatus is mated with the fuselage surface.

The vacuum port is connected to the containment chamber and is used to facilitate connection to a vacuum source.

The vacuum port is generally a tubular structure having a proximal end connected to the containment chamber and a distal end for connection to a vacuum source. The proximal end of the vacuum port is typically a circular or oval opening, and is a minimum of 7 inches in diameter so that large foam particles, many of which are over 2 inches in diameter, may be suctioned through the vacuum port without impairing air flow. The distal end of the vacuum port is also a minimum of 7 inches in diameter so that the foam particles may be transported completely through the port. Also, the distal end of the vacuum port is typically of standard dimensions so that it may be connectable to industrially available vacuum components.

The air inlet is provided in or through a wall of the containment chamber. The air inlet may be a simple hole or tube provided through a wall in the containment chamber or the air inlet may be provided by one or more of the walls of the containment chamber being of a porous material. Whatever the configuration of the air inlet, the purpose of the air inlet is to prevent a strict vacuum condition from forming within the containment chamber which might impair the flow of air and insulation particles through the apparatus. For instance, if a strict vacuum were formed by sealing the containment chamber against an aluminum or foam surface, then no transfer or removal of foam would take place because there would be no air flow in which to carry the foam residue. To prevent this condition, the air inlet provides a continuous stream of flowing air within the containment chamber, thus providing a vehicle to carry foam particles away from the insulated surface, through the vacuum port, and eventually to a particle storage system.

By utilizing the invented foam containment apparatus in conjunction with a rapid foam removal process such as dry ice stripping, particulate foam insulation is effectively removed from the fuselage of an aircraft or other aerospace structure without contaminating the aircraft or structure and causing foreign object damage.

BRIEF DESCRIPTION OF THE DRAWINGS

Figure 2:
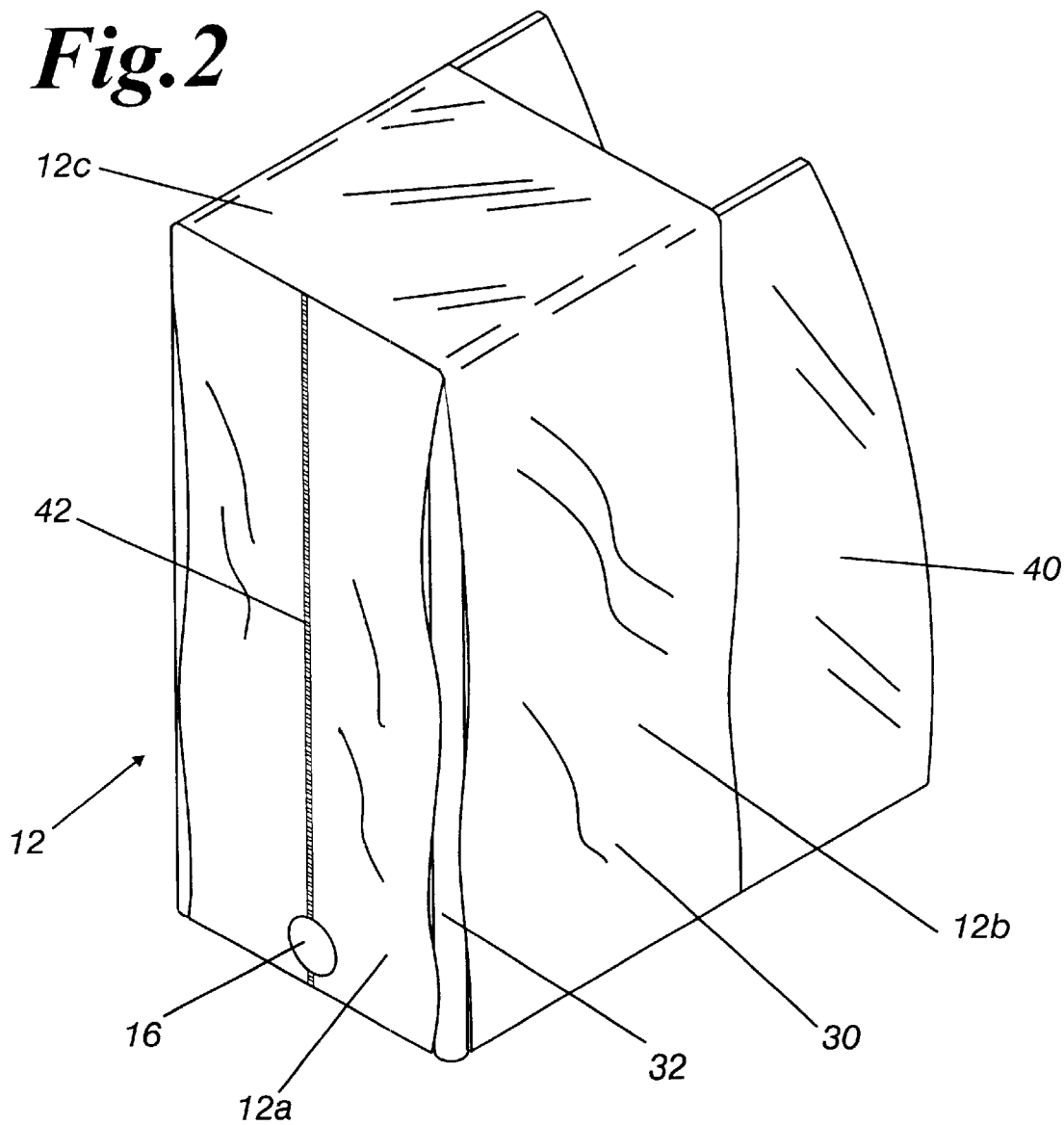
Figure 1B:
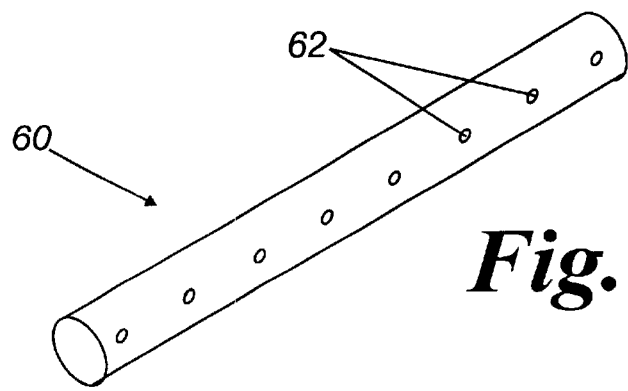
Figure 3:
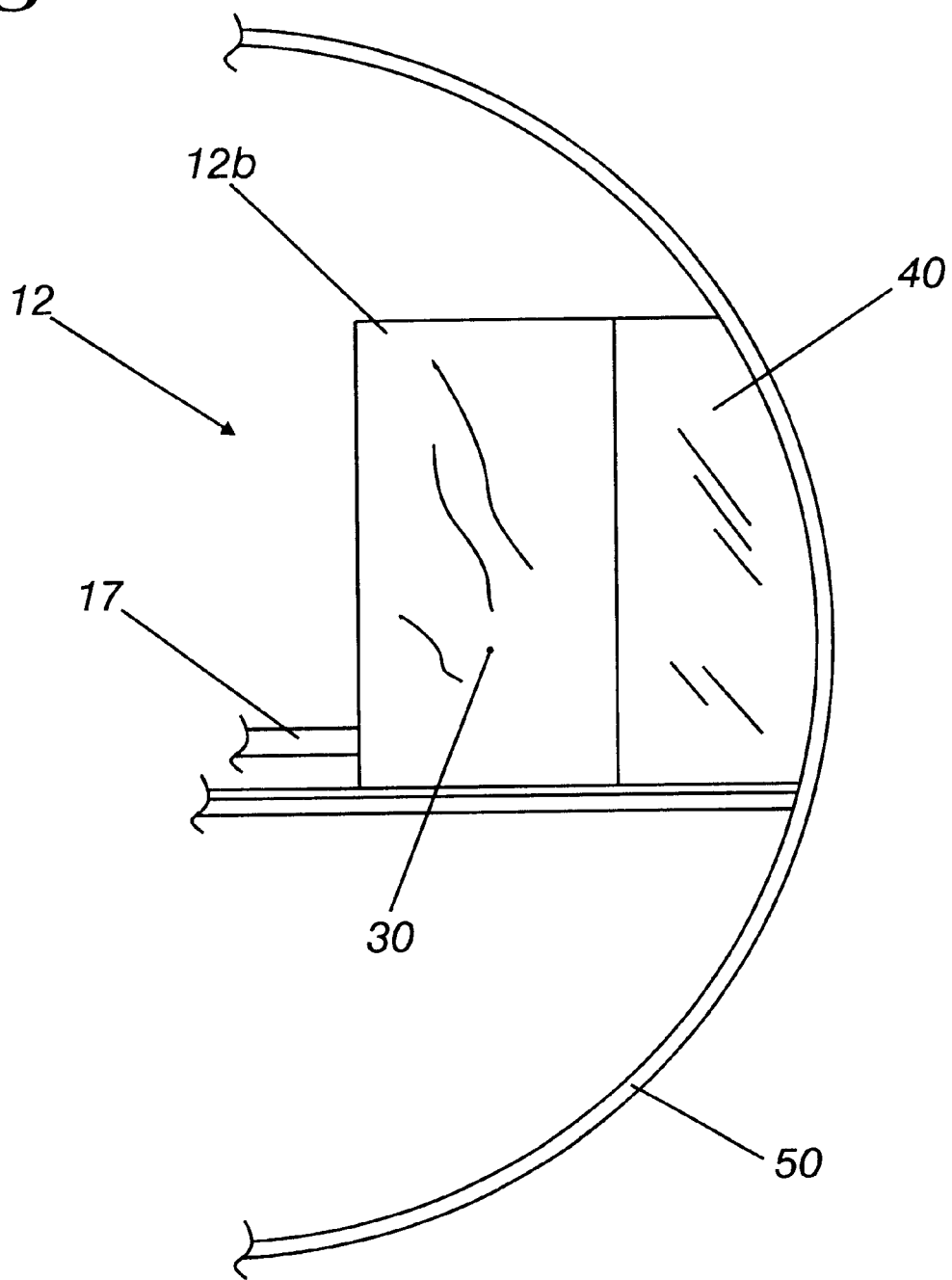

Having thus described the invention in general terms, reference will now be made to the accompanying drawings, which are not necessarily drawn to scale, and wherein:

FIG. 1 is a perspective view of an embodiment of the invention;

FIG. 1B is a perspective view of a component for use with the embodiment of the invention shown in FIG. 1;

FIG. 2 is a perspective view of another embodiment of the invention; and,

FIG. 3 is a side view of the embodiment of the invention shown in FIG. 2.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1 and 2, the invented containment apparatus primarily comprises a containment chamber 12, a foam inlet 14, a vacuum port 16, and an air inlet 18. The containment chamber 12 is a closed structure defining an internal volume and having one major opening, the foam inlet 14, at the forward region of the chamber. The vacuum port 16 provides fluid communication between the internal volume of the containment chamber 12 and a vacuum source. The vacuum port 16 is preferably a tube shaped port structure incorporated through a wall of the containment chamber 12. The air inlet 18 is a means by which air from the atmosphere is allowed into the containment chamber 12 when the foam inlet 14 of the chamber is sealed against a surface. The air inlet 18 is preferably a small opening in the surface of the containment chamber 12, and is alternatively a region of the containment chamber surface that is air permeable. Together, the containment chamber 12, foam inlet 14, vacuum port 16, and air inlet 18 form a containment apparatus capable of effectively removing and containing fragments of foam insulation from the fuselage of an aircraft or other aerospace structure.

The containment chamber 12 may be any of a wide variety of configurations and sizes. From a functional standpoint, it is important that the containment chamber 12 define an internal volume capable of being maintained with at least a partial vacuum. The containment chamber 12 is a substantially closed structure having only one main opening, termed the foam inlet 14, located at the forward portion of the chamber. It is conceivable that the chamber could have more than one foam inlet, though any and all foam inlets would necessarily be located toward the forward section of the chamber.

The foam inlet 14 may be formed in either of two ways. In the absence of a front surface, the foam inlet 14 is defined by the forward edges of the side 12b, upper 12c, and lower surfaces 12d of the chamber. Alternatively, the chamber has a forward surface with the foam inlet defined therein. In either case, the foam inlet is defined within the forward portion of the chamber.

The surrounding of the foam inlet 14 is shaped so that it corresponds to the dimensions or surface structure of the structure from which insulation is being removed. In the case of an aircraft fuselage, the fuselage can be thought of as a large cylindrical shell having a number of supporting cross-members. It is contemplated that one embodiment of this invention would only be utilized on a portion of the fuselage at any one time. By simply looking at an interior portion of the fuselage as it would be viewed by a human worker who was in close physical proximity to the fuselage, the fuselage appears as a slightly arcing, concave surface having one to several cross-members. Considering an even smaller portion of the fuselage, the fuselage may be viewed as an essentially flat surface, having one or more cross-members.

Alternatively, the surrounding of the foam inlet 14 is shaped so that it corresponds to a flat surface or other shaped surface such as those commonly insulated surfaces found in the bilge of aircraft, structures within spacecraft, or any other similar structures found in aerospace vehicles. By way of example, the embodiment of the invention shown in FIG. 1 is applicable to flat or near flat surfaces or to small portions of large curved surfaces, while the embodiment of the invention shown in FIG. 2 is applicable to large curved internal surfaces of an aircraft fuselage.

The purpose of the foam inlet 14 being shaped to correspond to the internal surface of an insulated structure is so that the edges of the chamber which define the foam inlet may intimately mesh, if not seal, to the selected portion of the structure. Mating the containment chamber 12 to the insulated structure by sealing the foam inlet to the surface of the structure serves two purposes. First, it creates a physical barrier that prevents particles of foam insulation residing on or near the surface of the structure from escaping during operation of the containment apparatus. Second, sealing the foam inlet 14 against the insulated structure allows a partial vacuum to be created within the containment chamber 12. The vacuum within the chamber is used to suction fragments of insulation away from the surface of the structure and out of the air surrounding the fuselage surface.

In order to facilitate the removal of particulate foam from a variety of locations within the fuselage or on the surface of other structures, the containment chamber of the containment apparatus may be embodied in a variety of sizes. The size of the containment chamber is generally determined by the amount of insulation being removed and the location of the insulation being removed from the structure.

More specifically, smaller embodiments of the containment apparatus, meaning those embodiments having foam inlets 14 with a circumference, width, or height of approximately 3 feet or less, have a foam inlet 14 defined by surfaces or edges of the containment chamber which are essentially coplanar with respect to one another. Larger embodiments of the containment apparatus, meaning those embodiments having main openings with a circumference, width, or height of approximately 7 feet or more, have a main opening defined by surfaces or edges of the containment chamber which arc from the top of the foam inlet 14 to the bottom of the foam inlet 14. Embodiments of sizes between the small and large sized embodiments have foam inlets 14 defined to correspond to the structure from which insulation is to be removed. Because the surrounding of the foam inlet 14 corresponds to the shape of the aerospace structure, the containment apparatus may be mated with the portion of the structure having the insulation removed or captured. For example, for removing small portions of insulation from an airplane fuselage, a smaller containment chamber may be used, with the the foam inlet 14 corresponding to and fitting around supporting members of the fuselage frame. Because the small portion of a cylindrical fuselage approximates a planer surface, a small containment apparatus designed for use on a small portion of the fuselage has a foam inlet 14 designed to interface with a planer surface.

Optionally, the smaller embodiments of this invention have a low-density gasket of foam or other compressible material that surrounds the foam inlet 14. The foam may be highly compressible neoprene or open cell polyurethane. The gasket is attached to the forward edges of the bottom 12*d*, top 12*c*, and side 12*b* surfaces of the containment chamber and is between about ½ inch to about 1 inch thick. The gasket provides an improved seal between the containment apparatus and the surface from which insulation is being removed.

In smaller embodiments of the invention, a small opening 32 is provided in the rear surface 12*a* of the containment chamber. The opening 32 is of a size corresponding to the nozzle of a dry ice blasting system. So that the area being serviced may be easily viewed, the rear surface 12*a* of the containment chamber is preferably constructed of Lexan™ or a similar high-strength transparent material.

In operation of the smaller embodiment of the invention, such as the one shown in FIG. 1, the containment apparatus is placed against the insulated surface with the foam inlet 14 abutting the surface. The nozzle of a dry ice blasting system may then be inserted through the opening 32 and the spray-on foam insulation is removed from the surface by blasting with dry ice. The pulverized particles of foam insulation are then removed by vacuum through the vacuum port 16.

For larger insulation removal projects, a large containment chamber is used, with the foam inlet corresponding to and fitting within the general cylindrical diameter of the tubular fuselage or fitting along the general surface of the insulated structure. By utilizing a containment chamber with a foam inlet 14 which corresponds to the structure, there are few or no gaps between the containment chamber and the structure during operation of the apparatus in which the apparatus is mated with the surface of the structure which aids in containment of the foam debris during removal.

In operation of the larger containment chambers, the operator of the dry ice foam removal system physically enters the booth with the nozzle of the dry ice removal apparatus. Once inside the chamber, the operator seals the entrance point of the chamber 42 prior to removal of insulation from the surface of the structure. The operator is allowed great freedom of motion within the large containment chamber in order to more effectively remove the insulation.

The vacuum port 16 of any size of the apparatus is connected to the containment chamber and provides communication from the internal volume of the containment chamber to the outside of the containment chamber and is used to facilitate connection of the containment chamber to a vacuum source via a vacuum hose 17. The vacuum port 16 is a generally tubular structure having a proximal end connected to the containment chamber and a distal end for connection to the vacuum source. The proximal end of the vacuum port 16 is typically a circular or oval opening, and is at least seven inches in diameter so that relatively larger foam insulation particles may be suctioned through the vacuum port 16. The distal end of the vacuum port 16 is also at least seven inches in diameter so that the foam particles may be transported completely through the port. The distal end of the vacuum port 16 is typically of standard dimensions so that it may be connectable to industrially available vacuum components via a vacuum hose 17. The vacuum port 16 is preferably connected to the lower portion of the containment chamber so that heavier particles of foam insulation debris will tend to naturally fall to a location of the containment chamber proximal to the vacuum port 16.

The air inlet 18 is provided in or through a wall of the containment chamber. The air inlet is embodied as a simple hole or tube provided through a wall in the containment chamber. Alternatively, the air inlet is provided by one or more of the walls of the containment chamber which is constructed of a porous material. Whatever the configuration of the air inlet, the purpose of the air inlet is to prevent a strict vacuum condition from forming within the containment chamber. For instance, if a strict vacuum were formed by sealing the containment chamber against an insulated structure, then no transfer or removal of foam would take place due to lack of air flow in the system. To prevent this condition, the air inlet provides a continuous flow of air within the containment chamber, thus providing a vehicle to carry foam particles away from the insulated surface, into the containment chamber, and through the vacuum port 16. Further, the provision of an air inlet prevents an overly powerful vacuum from forming within the containment chamber while engaged with the insulated surface, thus preventing possible damage to the structure or any components underlying the insulation. Vacuum flow rate within the chamber is preferably maintained within the range of 4200 ft$^3$/min to 4500 ft$^3$/min.

The containment apparatus is optionally attached to a vacuum and foam containment system for removal and storage of the foam insulation that has been removed from the structure. The vacuum port 16 of the containment apparatus is attached to one end of a flexible vacuum hose 17 such as a non-metallic bellows type hose 17 having a diameter from about 7 inches to about 10 inches. The second end of the hose is attached to a canvas containment bag. The containment bag allows air and the carbon dioxide remaining from the dry ice to pass through the permeable canvas material while trapping the large and small particles of insulation being removed from the structure.

A vacuum source is placed in-line with the vacuum hose 17, between the containment apparatus and the canvas containment bag. The vacuum source may be any apparatus commercially available and capable of moving a volume of approximately 4800 ft$^3$/min through a hose having a diameter of about 7 to about 10 inches. It has been found that the high volume air blowers usually used for the ventilation of confined spaces aboard aircraft may be used by simply running the blowers in reverse.

The carbon dioxide gas produced from the sublimation of dry ice during foam removal is removed from the site by the containment apparatus and transported into and through the canvas of the canvas containment bag. Because a high concentration of carbon dioxide may develop near the canvas containment bag, it is suggested that the containment bag be placed outside of the aircraft fuselage or the area being serviced. It is also suggested that applicable skin, eye, and hearing protection be worn at all time. A full fresh air respirator should also be used to avoid inhalation of foam particles during foam removal.

The disclosed apparatus and method gives the maintenance community the ability to rapidly remove spray-on foam insulation that does not damage or require subsequent chemical cleaning of the underlying structure.

EXAMPLES

Example 1

Small Containment Apparatus

With reference to FIG. 1, a small containment apparatus was formed out of a fiberglass material. The containment chamber 12 of the containment apparatus is a box shaped structure having rectangular rear 12a, side 12b, upper 12c, and lower 12d surfaces. There is no front surface of the containment chamber 12. The forward edges of the upper 12c, lower 12d, and side surfaces 12b of the chamber define the foam inlet 14. The containment chamber 12 is molded from a fiberglass material with the rear surface 12a measuring 24 inches high×32 inches wide×¼ inch thick, the upper 12c and lower 12d surfaces measuring 6¼ inches deep×32 inches wide×¼inch thick, and the side surfaces 12b measuring 24 inches high×6¼ inches deep×¼ inch thick.

The rear surface is constructed of Lexan™, a transparent polycarbonate material, so that the foam removal process may be visually observed through the rear of the containment apparatus.

The metallic vacuum port 16 is a generally tubular structure. The proximal end of the vacuum port 16 is received by and integral with the mid-section of the lower surface 12d of the containment chamber 12. The opening of the proximal end of the vacuum port 16 is generally rectangular, with a width of 20 inches and a depth of 5 inches. The distal end of the vacuum port 16 is circular with a diameter of 10 inches. The shape of the vacuum port 16 proceeds continuously from the rectangular cross-section of the proximal end of the port 16 to the circular cross-section of the distal end of the port 16 along the length of the vacuum port 16.

Two air inlets 18 are provided as 1⅛ inch diameter holes defined by the upper regions of the two side surfaces 12b of the containment chamber 12. Referring to FIG. 1b, a tube 60 having an outside diameter of approximately 1⅛ inches is inserted through the first and second air inlets 18 so that the tube spans the width of the containment chamber. The tube 60 is open on both ends and has several 3/16 inch diameter holes 62 spaced about 1 inch apart axially aligned along one side of the tube. The spaced holes of the tube face the rear 12a transparent Lexan™ surface of the containment chamber, effectively forming a windscreen with the incoming air which serves to defog the Lexan™ window. The tube is also equipped with a plug on one end and a pneumatic fitting on the other so that positive pressure may be applied to the containment chamber, if desired.

The containment chamber 12 defines four slots 20, two defined within the upper surface 12c and two defined within the lower surface 12d. Each of the four slots 20 is positioned 2¾ inches from the side surface, is approximately 1¾ inches wide, and extends rearward about 4½ inches from the forward edge of the respective upper 12c and lower 12d surfaces.

A foam rubber gasket 22 is affixed to the forward edge surfaces of the upper 12c, 12d, and side surfaces 12b, and also affixed to the edge surfaces formed within the slots 20 of the containment chamber 12. The gasket 22 is approximately 1 inch thick when not compressed.

Two rows of stiff brushes 26 are oriented horizontally and mounted to the inside of the containment chamber 12 on the rear surface 12a. The rows of brushes 26 are approximately 23½ inches wide×2¾ inches high. The bristles of the upper brush 26 extend downwardly at an angle and the bristles of the lower brush 26 extend upwardly at an angle such that the tips of the bristles loosely mesh together. The brushes allow a dry ice blast nozzle to protrude through the nozzle inlet 32 but prevent foam particles from blowing backwards through the nozzle inlet 32.

In use, the containment apparatus is abutted against the internal surface of an aircraft fuselage, with the vacuum port 16 facing the fuselage. The vertical cross-members of the fuselage are received by the slots 20, such that the apparatus rests flush against the insulated or partially insulated surface of the fuselage. As the apparatus is moved slowly up and down, the particles of insulation are dislodged by the dry ice blasting procedure. The removed foam is sucked through the vacuum port 16 and collected.

Example 2

Large Containment Apparatus

With reference to FIG. 2, a large containment apparatus was formed by supporting a canvas material 30 about a rigid PVC tube frame 32. The containment chamber 12 of the containment apparatus consists of a PVC pipe frame 32 constructed from twelve elongate pipe members. The pipe members are joined at their respective ends to form a box structure having a height of 96 inches, width of 72½ inches, and depth of 48 inches.

The containment chamber 12 surfaces are heavy air-permeable canvas panels 30 which are supported by and attached to the underlying pipe frame 32. The canvas forms 30 two side panels 12b, a top panel 12c, and a rear panel 12a. The forward section of the box shaped containment chamber 12 is left open, and acts as the foam inlet. The bottom of the chamber 12 does not have and does not need a canvas panel since a containment apparatus of this size will rest on the floor when in use, and the floor acts as a bottom panel.

The vacuum port 16 is simply an 11 inch diameter tube passing through the rear canvas panel 12a, located in the lower region and along the vertical midline of the rear panel 12a. Having the vacuum port 16 located in the lower portion of the containment chamber 12 facilitates the collection of particulate foam material which falls by gravity to the lower portion of the containment apparatus. The vacuum port 16 connects to a vacuum hose 17.

The air-permeable canvas acts as the air inlet in this embodiment. Because the canvas panels are air-permeable, no other opening is needed in order to prevent a strong vacuum from forming within the containment chamber. At the same time, the canvas panels serve their barrier function by keeping the particulate foam, which cannot pass through the canvas material, contained within the containment chamber 12.

In order to mate the containment chamber 12 to the internal surface of the aircraft fuselage, two contour panels 40 are provided. Each contour panel 40 has a top edge, bottom edge, straight side edge, and convex side edge. The bottom edges are about 24 inches long and the top edges are about 9 inches long, with the convex side edge making a gentle convex arc from the top to the bottom of the panel. The straight side edges of the respective contour panels are attached to the forward right and forward left vertical pipes such that the surfaces of the contour panels 40 are co-planar with the canvas side panels 12b.

Referring to FIG. 3, in this configuration, the containment apparatus is abutted against the internal surface of the aircraft fuselage 50 with the convex edge of the contour panels 40 contacting the fuselage surface. In this manner, the portion of the fuselage being maintained or inspected is completely surrounded by the various portions of the containment apparatus, and particulate foam material is eventually dislodged and suctioned through the vacuum port, without escaping to the main aircraft cabin area.

With a containment apparatus of this size, the apparatus may be easily used with a workperson standing within the apparatus. The back panel 12a of the containment chamber 12 has a zippered opening 42 so that the inside of the chamber is accessible to workers without having to disengage the chamber from the fuselage.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A containment apparatus for collecting fragments of foam insulation from the fuselage of an aircraft, said apparatus comprising a containment chamber defining an internal volume and capable of receiving at least a portion of a dry ice blasting apparatus, a foam inlet defined by said containment chamber, said foam inlet shaped to conform to an insulated surface of an aerospace system, a vacuum port in fluid communication with said containment chamber for providing transport of foam between the internal volume of the containment chamber and a vacuum source, and an air inlet formed by at least one portion of said containment chamber.

2. The apparatus of claim 1, wherein the air inlet is a portion of the containment chamber formed of an air permeable material.

3. The apparatus of claim 2, wherein the containment chamber comprises a flexible material which is air permeable whereby the flexible material acts as the air inlet, and a rigid frame, wherein the flexible material is supported about the rigid frame.

4. The apparatus of claim 3, wherein the front edges of the side surfaces of the containment chamber are convex such that the forward opening of the containment chamber is intimately mateable with the internal curvature of an aircraft fuselage.

5. The apparatus of claim 2, wherein the containment chamber comprises a flexible material which is air permeable whereby the flexible material acts as the air inlet, a rigid frame, and two rigid contour panels, each contour panel having a convex edge, wherein the flexible material is supported about the rigid frame and each contour panel is supported by the rigid frame such that the convex edge of each contour panel is mateable with the curvature of the internal surface of an aircraft.

6. The apparatus of claim 5, wherein said flexible material is canvas.

7. The apparatus of claim 5, wherein said rigid frame comprises metallic frame members.

8. The apparatus of claim 5, wherein said rigid frame comprises polymeric frame members.

9. The apparatus of claim 5, wherein the rigid frame forms a cube that is about 8 feet tall, about 4 feet deep, and about 6 feet wide.

10. The apparatus of claim 5, wherein a portion of said flexible material defines a closeable aperture.

11. The apparatus of claim 10, wherein the containment chamber further comprises a zipper for closing said closeable aperture.

12. The apparatus of claim 1, wherein the air inlet is a port defined through a solid portion of the containment chamber structure.

13. The apparatus of claim 12, wherein the containment chamber comprises solid side, upper, lower, and rear surfaces.

14. The apparatus of claim 12, wherein the vacuum port comprises an elongated tube having an end proximal to the chamber and an end distal to the chamber, said distal end of said tube having a circular cross-section.

15. The apparatus of claim 14, further comprising brush heads having brush fibers affixed to the rear surface of the chamber such that the brush fibers project toward the forward opening of the chamber.

16. The apparatus of claim 13, wherein said upper and lower surfaces of the chamber define slots, said slots extending rearward from the forward edges of the respective upper and lower surfaces, wherein the slots are spaced apart from one another in order to correspond to and engage with the internal support members of an aircraft fuselage.

17. The apparatus of claim 13, further comprises a flexible gasket lining the forward edge of the side, upper, and lower surfaces.

18. The apparatus of claim 17, wherein the flexible gasket lines said slots.

19. The apparatus of claim 18, wherein the flexible gasket is constructed from blown foam.

20. The apparatus of claim 13, wherein the chamber surfaces are constructed of polymeric material.

21. The apparatus of claim 20, wherein said polymeric material is transparent polycarbonate material.

22. The apparatus of claim 1, further comprising:
 a vacuum hose having a first and a second end, wherein said first end of said vacuum hose is connected to said vacuum port;
 a insulation collection bag connected to said second end of the vacuum hose; and,
 a vacuum source placed in-line with said vacuum hose.

23. The apparatus of claim 22, wherein the vacuum hose has a diameter of about 7 to about 11 inches.

24. The apparatus of claim 22, wherein the collection bag is constructed of air permeable canvas.

25. The apparatus of claim 22, wherein the vacuum source provides a flowrate of about 4800 $ft^3$/min.

26. A containment apparatus for collecting fragments of foam insulation from the fuselage of an aircraft, said apparatus comprising
 a containment chamber defining an internal volume, said containment chamber capable of receiving at least a portion of a dry ice blasting apparatus,
 a foam inlet defined by said containment chamber, said foam inlet shaped to conform to an insulated surface of an aerospace system,
 a vacuum port in fluid communication with said containment chamber for providing transport of foam between the internal volume of the containment chamber and a vacuum source,
 an air inlet formed by at least one portion of said containment chamber, and
 a nozzle of a dry ice blasting apparatus disposed within said containment chamber.

27. A method of removing and containing foam insulation from the surface of an aerospace structure, comprising:
 isolating the region of the structure from which insulation is to be removed by mating a containment chamber to the insulated surface;
 pulverizing the foam insulation from the insulated surface using a dry ice blast method;
 providing suction to the containment chamber via a vacuum port defined by the containment chamber; and,
 transporting the pulverized particles of insulation through the vacuum port to a collection container.

28. The method of claim 27, wherein the steps of pulverizing the foam insulation and providing suction to the containment chamber occur simultaneously.

29. The method of claim 27, wherein the steps of pulverizing the foam insulation and providing suction to the containment chamber occur consecutively.

30. The method of claim 27, wherein the step of pulverizing the foam insulation comprises
 disposing a nozzle of a dry ice stripping apparatus within the containment chamber; and
 pulverizing the foam insulation with dry ice pellets projected from the nozzle of the dry ice stripping apparatus.

31. The method of claim 27, wherein providing suction to the containment chamber comprises applying a vacuum to the containment chamber capable of moving about 4800 $ft^3$/min.

32. The method of claim 31, further comprising providing a vacuum limiting air inlet in the containment chamber so that a continuous flow of air is maintained.

33. The method of claim 27, further comprising trapping foam particles of the insulation within the collection container while allowing air and carbon dioxide to escape the collection container.

* * * * *